United States Patent [19]

Murano et al.

[11] 4,312,075
[45] Jan. 19, 1982

[54] TIMING-PHASE RECOVERY CIRCUIT

[75] Inventors: Kazuo Murano, Tokyo; Shigeyuki Unagami; Yoshikazu Itoh, both of Kawasaki; Fumio Amano, Yokohama; Tatsuki Hayashi, Kawasaki, all of Japan

[73] Assignee: Fujitsu Limited, Japan

[21] Appl. No.: 56,641

[22] Filed: Jul. 11, 1979

[30] Foreign Application Priority Data

Jul. 14, 1978 [JP] Japan .................. 53-85842
Jul. 29, 1978 [JP] Japan .................. 53-92778
Jul. 31, 1978 [JP] Japan .................. 53-93503
Sep. 28, 1978 [JP] Japan .................. 53-119677

[51] Int. Cl.³ .............................. H04L 7/02
[52] U.S. Cl. .................... 375/106; 375/113; 370/100; 307/353; 307/354
[58] Field of Search .............. 375/106–121; 370/100–108; 307/353, 354, 252 VA; 328/24, 63, 133; 371/42, 46; 364/111, 572, 711

[56] References Cited

U.S. PATENT DOCUMENTS

| 4,130,724 | 12/1978 | Bousmar | 375/116 |
| 4,213,134 | 7/1980 | Chen | 307/353 |
| 4,229,825 | 10/1980 | Guidoux | 375/118 |

Primary Examiner—Benedict V. Safourek
Assistant Examiner—Stephen Chin
Attorney, Agent, or Firm—Staas & Halsey

[57] ABSTRACT

A timing-phase recovery circuit, which is suitably mounted on a digital LSI, includes a timing phase recovery circuit. The timing-phase recovery circuit includes a first circuit for extracting a digital timing signal from a received input analogue signal, a second circuit for detecting a virtual zero crossing included in the digital timing signal in synchronism with a sampling signal and a third circuit for carrying out a phase shift with respect to the sampling signal in order to tune the timing signal to the frequency of the virtual zero crossings in a very short period of time.

19 Claims, 23 Drawing Figures

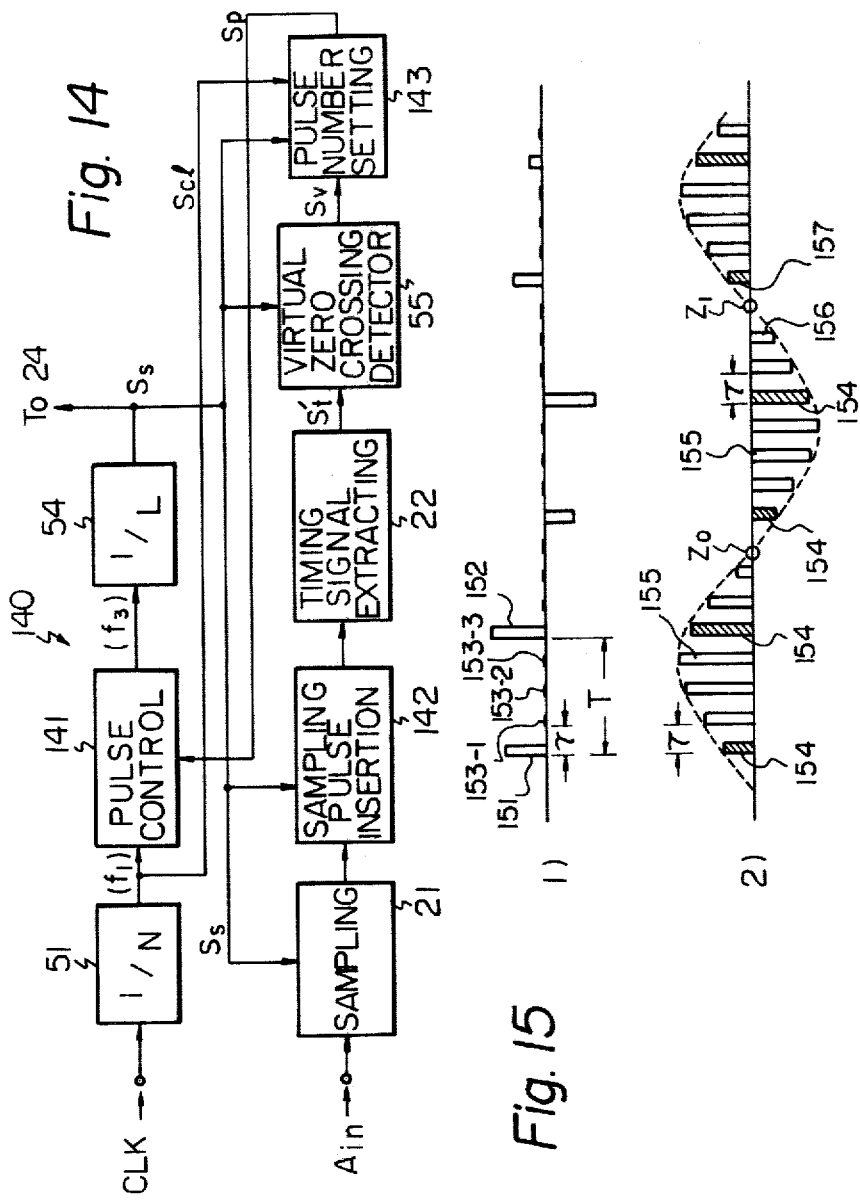

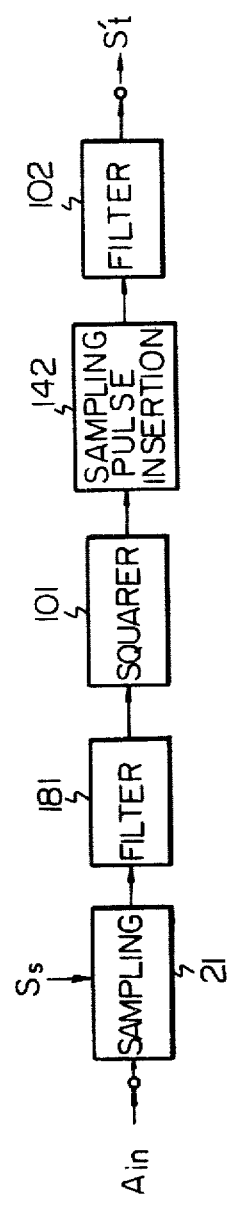
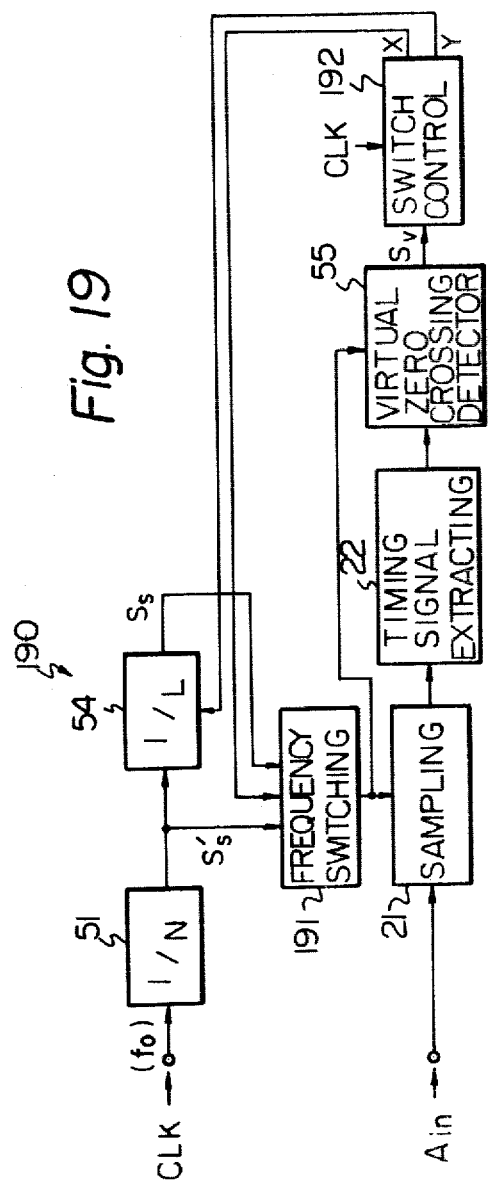

TIMING-PHASE RECOVERY CIRCUIT

BACKGROUND OF THE INVENTION

The present invention relates to a timing-phase recovery circuit, and more particularly a timing-phase recovery circuit located in a receiver station of a carrier-modulated data communication system.

In a carrier-modulated data communication system, a carrier-modulated analogue signal is transmitted from a sender station to a receiver station, and a carrier-modulated analogue signal is produced, in the sender station, based on a PSK (Phase Shift Keying) modulation mode, a QAM (Quadrature Amplitude Modulation) mode or an AM (Amplitude Modulation) mode. In order to establish any of the above mentioned modulation modes, the analogue signal to be transmitted from the sender station is modulated by data to be communicated, in synchronism with a predetermined timing signal having a constant frequency. In the receiver station, which receives the analogue signal, the received input analogue signal is demodulated and the original data is reproduced by means of a timing recovery circuit in synchronous with a timing signal. This timing signal should be identical with the aforesaid timing signal generated in the sender station. Accordingly, the timing signal of the receiver station is tuned to a timing signal which is extracted from the input analogue signal. A tuning operation between the extracted timing signal and the timing signal generated in the receiver station must be promptly completed. This is because an automatic equalizer, an automatic gain control circuit and so on of the receiver station can start respective operations after the timing signal of the receiver station has correctly been tuned to the extracted timing signal. Further, according to world standards pertaining to the carrier-modulation data communication system, the receiver station must be set in normal operating condition in a very short period, such as 50 ms, from the time when the input analogue signal is applied thereto. Thus, the timing-phase recovery circuit of the receiver station must complete the tuning operation in a very short time.

In the prior art, the timing-phase recovery circuit consists of an analogue circuit. The timing-phase recovery analogue circuit is described, for example in IEEE TRANSACTIONS ON COMMUNICATIONS, VOL. COM-22, No. 7, July 1974, on pages 913 through 919, entitled "Statistical Properties of Timing Jitter in a PAM Timing Recovery Scheme" and in IEEE TRANSACTIONS ON COMMUNICATIONS, November 1975, on pages 1327 through 1331, entitled "Envelope-Derived Timing Recovery in QAM and SQAM Systems". Since the timing-phase recovery analogue circuit deals with an analogue timing signal, the so-called zero crossing can be detected in a very short time. The zero crossing is very useful for tuning the timing signal of the receiver station to the extracted timing signal contained in the input analogue signal.

In recent years, a demand has arisen for constructing the timing-phase recovery circuit as a digital circuit. A timing-phase recovery digital circuit may easily be fabricated as an LSI (Large Scale Integration) circuit, and accordingly the timing-phase recovery digital circuit becomes cheaper in cost, more accurate in operation and smaller in size, when compared to prior timing-phase recovery analogue circuits. In general, it is easy for a person skilled in the art to create the timing-phase recovery digital circuit according to the corresponding timing-phase recovery analogue circuit, merely by substituting the analogue circuit elements of the analogue circuit for the corresponding digital circuit elements. However, the above-mentioned timing-phase recovery digital circuit creates a serious defect in the aforesaid tuning operation. That is, the digital circuit cannot complete the tuning operation in a very short time. The reason why the tuning operation can not be completed in a very short time, will be clarified hereinafter. However, in short, the reason resides in the fact that, in the timing-phase recovery digital circuit, the aforesaid zero crossing cannot be detected from the input analogue signal in a very short period of time.

SUMMARY OF THE INVENTION

Therefore, it is an object of the present invention to provide a timing-phase recovery circuit, comprising digital circuit elements, which creates no serious defect as mentioned above; that is, the digital timing phase recovery circuit of the present invention can complete the tuning operation in a very short time, as is the case with the prior art timing-phase recovery analogue circuit.

BRIEF DESCRIPTION OF THE DRAWINGS

The present invention will be more apparent from the ensuing description with reference to the accompanying drawings wherein:

FIG. 14 is a block diagram illustrating a second embodiment of a timing-phase recovery circuit, according to the present invention;

FIG. 15 depicts imaginary analogue signals corresponding to the digital outputs produced from circuits 142 and 22 respectively, shown in FIG. 14;

FIG. 18 is a block diagram illustrating a modified arrangement of blocks 21, 142 and 22 shown in FIG. 14, according to the present invention;

FIG. 19 is a block diagram illustrating a third embodiment of a timing-phase recovery circuit, according to the present invention;

DETAILED DESCRIPTION OF THE PREFERRED EMBODIMENTS

Figure 1:
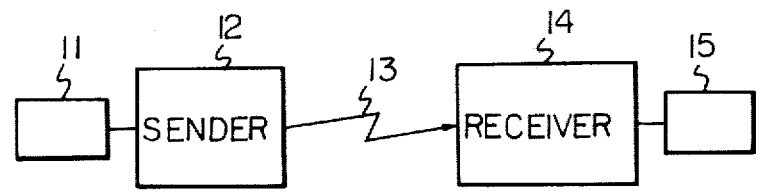
FIG. 1 is a schematic block diagram of a typical carrier-modulated data communication system.

In FIG. 1, a typical carrier-modulated data communication system comprises a data terminal 11, a sender station 12, a transmission line 13, a receiver station 14 and a data terminal 15. Data supplied from the terminal 11 is applied to the sender station 12, and a carrier which is modulated by the data is transmitted, via the line 13, from the station 12, to the receiver station 14, in the form of an analogue signal, such as a PSK, QAM or AM signal. The station 14 receives the input analogue signal, and the input analogue signal is demodulated therein. The demodulated input analogue signal, that is the original data produced by the terminal 11, is supplied to the data terminal 15. Among the schematic blocks shown in FIG. 1, the present invention is directed to the receiver station 14.

Figure 2:
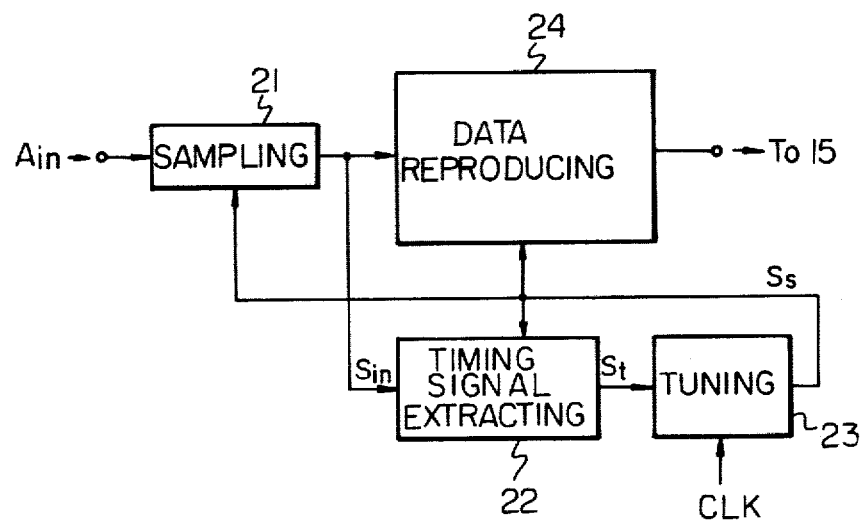
FIG. 2 is a schematic block diagram of a receiver station 14 (shown in FIG. 1) according to the present invention.

The receiver station 14 comprises the elements illustrated in FIG. 2. In FIG. 2, the elements to which the present invention is directed are referred to by reference numerals 21, 22 and 23. The reference numeral 24 represents a conventional data reproducing circuit which includes the automatic equalizer, the automatic gain control circuit, the digital processor and so on. This circuit 24 receives the input analogue signal Ain from the transmission line 13 (FIG. 1) by way of a sampling circuit 21 and reproduces the original data in synchronism with the timing signal. The timing signal is generated in synchronism with a sampling signal $S_s$ produced from a tuning circuit 23. The sampling signal $S_s$ is derived from a reference clock signal CLK which is tuned to an extracted timing signal $S_t$ produced from a timing signal extracting circuit 22. The circuit 22 receives a sampled input signal Sin and extracts the timing signal $S_t$ therefrom. The signal $S_t$ is originally included in the signal Ain, because the signal Ain has been modulated in the sender station 12 (see FIG. 1) in synchronism with an identical timing signal. The sampling signal $S_s$ is also applied to circuits 21 and 22.

Figure 3:
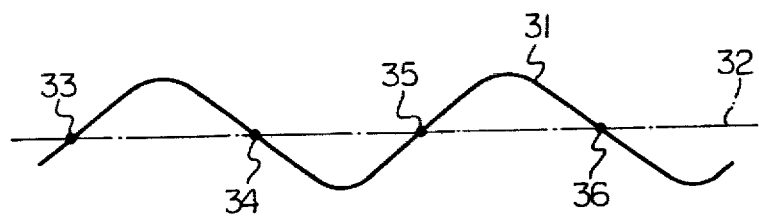
FIG. 3 depicts a waveform of an analogue timing signal obtained in a prior art timing-phase recovery analogue circuit.

In the prior art, a timing signal extracting analogue circuit, which corresponds to the circuit 22, comprises analogue circuit elements. Accordingly, an analogue timing signal is obtained therefrom. This signal is illustrated, in FIG. 3, as a waveform 31. The analogue timing signal 31 is compared with a threshold level 32, and then zero crossings 33, 34, 35, 36 and so on are detected in a very short time. As mentioned above, these zero crossings are very useful for tuning the timing signal of the data reproducing circuit 24 (see FIG. 2) to the input analogue signal Ain. Only the zero crossing which are located at the intersection of the level 32 and the right-upwardly inclined portions of the waveform 31, such as the zero crossings 33, 35, and so on, are utilized for carrying out the tuning operation in this embodiment.

Figure 4:
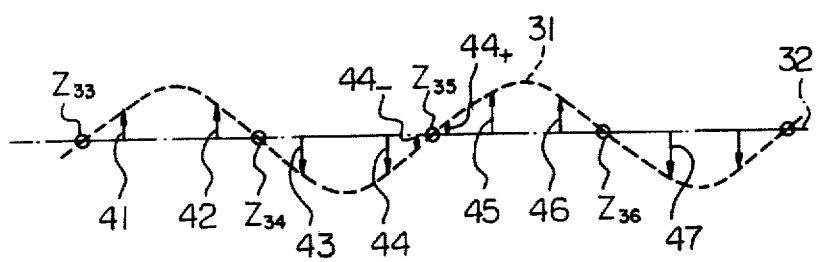
FIG. 4 depicts a waveform of a digital timing signal, illustrated in an imaginary analogue waveform, obtained in a timing-phase recovery circuit, according to the present invention.

In contrast to the above, the timing signal extracting circuit 22 (see FIG. 2) receives the sampled input signal Sin and extracts therefrom a sampled timing signal $S_t$ through digital processing steps. The sampled timing signal $S_t$ is imaginarily represented, in FIG. 4, by arrows 41, 42, 43, 44 and so on. It should be noted that each signal $S_t$ represented by an arrow is not an analogue value but a digital value. Also, the imaginary timing signal illustrated by dotted line 31 in FIG. 4, shows the envelop of the available digital signal. The imaginary waveform and arrows of FIG. 4 are drawn only for facilitating the understanding of the present invention. The sampled timing signals $S_t$ (41, 42, 43, and so on) are produced from the circuit 22 (see FIG. 2) at the same frequency as the sampling signal $S_s$ (see FIG. 2). Since the sampled timing signal $S_t$ is not produced continuously but intermittently, zero crossings which are imaginarily illustrated by circles in FIG. 4, cannot be detected instantaneously. These zero crossings are not actually existing zero crossings, as are the zero crossings 33, 35 and so on shown in FIG. 3, but virtual zero crossings. If the signal $S_t$ (41, 42, 43 and so on) appears at the virtual zero crossings, the tuning operation may be promptly completed. However, the probability that the signal $S_t$ appears precisely at the virtual zero crossings is very low. Further, for the following reason, it takes an extremely long time to shift the signal $S_t$ to its nearest virtual zero crossing. The sampled timing signal $S_t$ has a mean frequency $f_t$, and the sampling signal $S_s$ has a frequency $f_s$. Usually, the sampling frequency $f_s$ is selected to be $N \cdot f_t$ ($N \geq 2$), that is $f_s \simeq N \cdot f_t$, in accordance with the well-known sampling theorem. Accordingly, the signal $S_t$ is shifted to its nearest virtual zero crossing by the value of $|f_s - N \cdot f_t|$. If the value $|f_s - N \cdot f_t|$ is relatively large, the signal $S_t$ may soon be shifted to its nearest virtual crossing. However, since the value $|f_s - N \cdot f_t|$ is very small, for example 0.001[%] of the frequency $f_t$, it takes an extremely long time to shift the signal $S_t$ to its nearest virtual zero crossing. Thus, in the timing-phase recovery digital circuit, the aforesaid tuning operation cannot be completed in a very short time.

In order to complete the tuning operation in a very short time, the timing-phase recovery circuit of the present invention is basically comprised of a first means for detecting the virtual zero crossing and a second means for shifting the sampled timing signal $S_t$ to the detected virtual zero crossing. The present invention will be clarified by the first through third embodiments described below.

Figure 5:
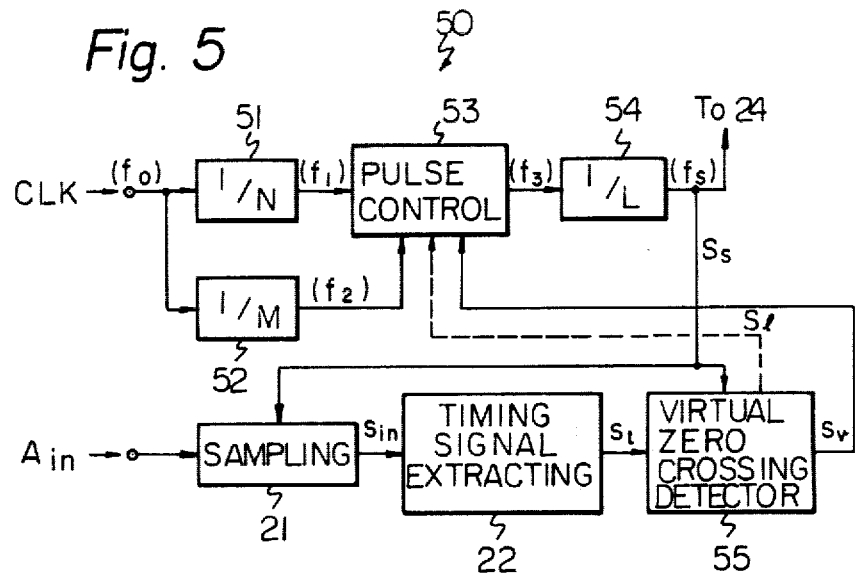
FIG. 5 is a block diagram illustrating a first embodiment of a timing-phase recovery circuit according to the present invention.

In FIG. 5, which is a block diagram illustrating the first embodiment of the timing-phase recovery circuit, the elements shown in FIG. 5 correspond to elements 21, 22 and 23 shown in FIG. 2. The timing-phase recovery circuit 50 receives the reference clock signal CLK, and the input analogue signal Ain, and the circuit 50 generates the tuned sampling signal $S_s$, as a timing signal, to the data reproducing circuit 24. The above reference symbols CLK, Ain $S_s$ and the above reference numeral 24 are shown in FIG. 2. Also, in FIG. 5, the sampling circuit 21, the timing signal extracting circuit 22, the sampled signals Sin and the extracted signal $S_t$, are shown in FIG. 2. The input analogue signal Ain is sampled by the sampling circuit 21 with the sampling frequency $f_s$ defined by the sampling signal $S_s$. In this case, the signal $S_s$ is not yet tuned to the timing signal included in the signal Ain. The sampled input signal Sin from the circuit 21 is applied to the timing signal extracting circuit 22, and then the timing signal included in the signal Sin (refer to the imaginary waveform 31 in FIG. 4) is extracted therefrom. Thereafter, the extracted timing signal $S_t$ is applied to a virtual zero crossing detector 55. When the detector 55 does not detect the virtual zero crossing, the detector 55 generates a virtual zero crossing detecting signal $S_v$ having logic "0". When the detector 55 detects the virtual zero crossing, the detector 55 produces the signal $S_v$ having logic "1". As previously mentioned, the detector 55 detects only the crossings $Z_{33}$, $Z_{35}$ and so on (see FIG. 4). Since the zero crossings $Z_{33}$, $Z_{35}$ and so on are not actually existing zero crossings, the detector 55 finds the existence of each virtual zero crossing by using a special logic circuit. Details of this special logic circuit will be described hereinafter, with reference to FIG. 6.

On the other hand, in FIG. 5, the reference clock signal CLK having the frequency $f_0$ is applied to both a first frequency divider (1/N) 51 and a second frequency divider (1/M) 52. The dividing number M equals K times the dividing number N, that is M=K·N, where K is greater than or equal to 2. The divided clock signal having a frequency $f_1$ is applied to a third frequency divider (1/L) 54 by way of a pulse control circuit 53. The clock signal having a frequency $f_3$ from the circuit 53 becomes, via the divider 54, the sampling signal $S_s$ having the frequency $f_s$. The pulse control circuit 53 removes some clock pulses from the pulse train supplied from the divider 51 every time the rising edge of the clock signal having a frequency $f_2$ is applied to the circuit 53, when the signal $S_v$ having logic "0" is applied to the circuit 53. This logic "0" of the signal $S_v$ denotes that the virtual zero crossing is not yet detected. During the period when the signal $S_v$ is logic "0", the number of clock pulses is reduced, and accordingly the frequency of the clock signal from the divider 54, that is the sampling signal $S_s$ is low. In this case, the following equations are obtained:

$$f_1 = 1/N \cdot f_0 \quad (1)$$

$$f_3 = f_1 - f_2 \quad (2)$$

and $$f_s = 1/L \cdot f_3 \quad (3)$$

Therefore, in FIG. 4, each period between each two adjacent timing signals $S_t$ (41, 42, 43 and so on) is wide. In other words, all the timing signals $S_t$ are shifted very quickly in a rightward direction in FIG. 4. As a result, the timing signal $S_t$ referenced by the numeral 44 approaches the nearest virtual zero crossing $Z_{35}$ very quickly. When the signal $S_t$ (44) is located either just at the zero crossing $Z_{35}$ or very near the zero crossing $Z_{35}$, the phase of the sampling signal $S_s$ and the phase of the timing signal $S_t$ become an in-phase condition. Here, the tuning operation is completed in a very short time, and the signal $S_v$ becomes logic "1" indicating that the circuit 53 should stop removing the clock pulses from the pulse train produced from the divider 51.

Figure 6:
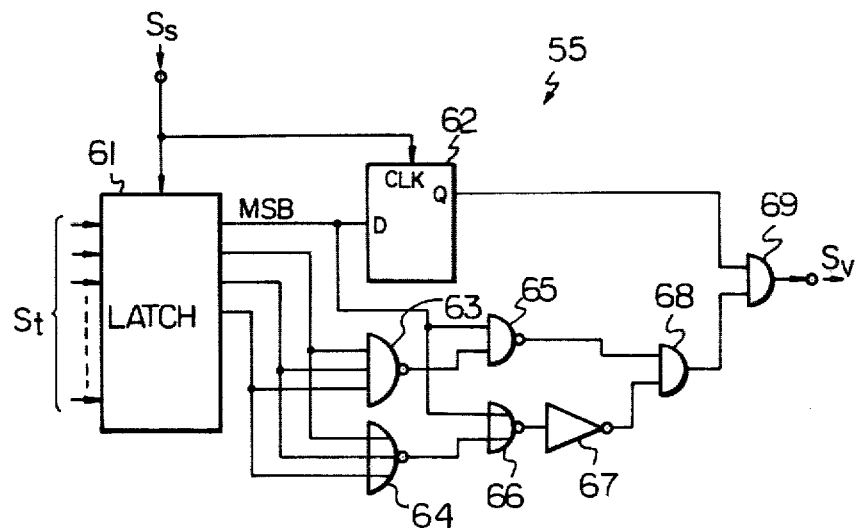
FIG. 6 is a circuit diagram illustrating the details of the virtual zero crossing detector 55 shown in FIG. 5.

Details of the above-mentioned special logic circuit, that is the virtual zero crossing detector 55 shown in FIG. 5, will be explained by referring to FIG. 6. In FIG. 6, the virtual zero crossing detector 55 receives the sampled timing signal $S_t$ (see FIG. 5), which is a digital signal, and then produces the zero crossing detecting signal $S_v$ (see FIG. 5) in synchronism with the signal $S_s$ (see FIG. 5). The signal $S_t$ is momentarily stored in a latch circuit 61 every time the signal $S_s$ is applied thereto. If the signal $S_t$ is composed of an 8-bit digital pulse, the circuit 61 may be comprised of eight flip flop circuits. Further, the signal $S_t$ is expressed by the well known two's -complement indication. Therefore, when the signal $S_t$ indicates the value of zero, the signal $S_t$ is expressed by (00000000). When the signal $S_t$ indicates positive value, the 8 bits of this signal $S_t$ may vary from (00000001) to (01111111), via (00000011), (00000111) and so on. When the signal $S_t$ is a negative value, the 8 bits of the signal $S_t$ may vary from (11111111) to (10000000), via (11111110), (11111100) and so on. A most significant bit MSB, which represents whether the signal $S_t$ is a positive value or a negative value, is applied, on one hand, to a delay flip-flop circuit 62, and, on the otherhand, to a NAND gate 65 and a NOR gate 66. The upper 3 bits of data from the circuit 61 are applied to both the gates 63 and 64. The upper 3 bits of data indicate one-eighth of the peak amplitude level of the signal $S_t$. Accordingly, when the upper 3 bits are logic (000), it is concluded that the signal $S_t$ has a very low positive value. That is, the signal $S_t$ is located just at or close to the virtual zero crossing. When the upper 3 bits are logic (111), it is concluded that the signal $S_t$ has a very low negative value. That is, the signal $S_t$ is located just at or close to the virtual zero crossing. If, in FIG. 4, the signal $S_t$ is located on the arrow 44-, the upper 3 bits are logic (111). Then, returning to FIG. 6, the output of the gate 63 becomes logic "0". Since the MSB is logic "1", the output of the gate 65 becomes logic "1". In the case, since the output of the gate 64 is logic "0" and the MSB is logic "1", the output of the gate 66 is logic "0". Then the output of an inverter 67 is logic "1". Thus, the output of an AND gate 68, being logic "1", is applied to the input of an AND gate 69. The gate 69 produces the signal $S_v$ having logic "1", when a Q-output of the flip flop 62 is logic "1". As previously mentioned, in FIG. 4, only the virtual zero crossings $Z_{33}$, $Z_{35}$ and so on, are available. That is, these zero crossings are located at the portions where the polarity of the signal $S_t$ changes from negative to positive. The flip flop 62 is useful for determining that the signal $S_t$ is not located close to the virtual zero crossings $Z_{34}$, $Z_{36}$ and so on, but at the available virtual zero crossings $Z_{33}$, $Z_{35}$ and so on. This flip flop 62 provides information indicating that a preceding signal $S_t$ is a negative value, and accordingly the Q-output thereof is logic "1". Then, the signal $S_v$ having logic "1", which denotes that the virtual zero crossing has been detected, is produced from the gate 69. In the other case, in FIG. 4, if the signal $S_t$ is located on the arrow 44+, the upper 3 bits are logic (000). Then the output of the gate 64 becomes logic "1". Since the MSB is logic "0", the output of the gate 66 becomes logic "0", and the output of the inverter 67 becomes "1". In this case, since the output of the gate 63 is logic "1" and the MSB is logic "0", the output of the gate 65 is logic "1". Thus, the output of the gate 68 becomes logic "1". If the output of the flip flop is logic "1", then the signal $S_v$ having logic "1" is produced from the gate 69.

Figure 7:
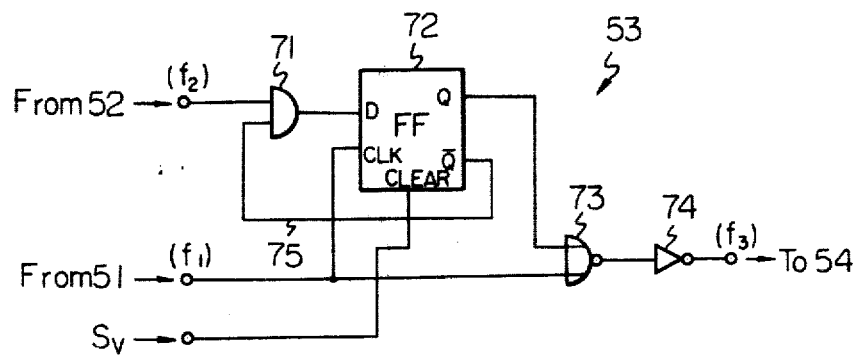
FIG. 7 is a circuit diagram illustrating the details of the pulse control circuit 53 shown in FIG. 5, according to the present invention.

The virtual zero crossing detecting signal $S_v$ is applied to the pulse control circuit 53. In FIG. 7, which is a circuit diagram illustrating details of the pulsecontrol circuit 53, the circuit 53 receives the clock signals having the frequencies of $f_1$ and $f_2$ (see FIG. 5) and the signal $S_v$ (see FIGS. 5 and 6), and then the circuit 53 produces the clock signal having the frequency $f_3$ (see FIG. 5). During the application of the signal $S_v$ having logic "0" to a delay flip flop 72, the frequency $f_3$ of the clock signal from the circuit 53 is defined by the above recited equation (2), that is $f_3=f_1-f_2$. When the logic of the signal $S_v$ is logic "0", the flip flop 72 is not reset, and when the clock signal ($f_2$) is applied to an AND gate 71, a Q-output of the flip flop 72 changes from logic "0" to logic "1". Therefore, a NOR gate 73 closes, and accordingly, the clock signal ($f_1$) is not supplied to an inverter 74 every time a rising edge of the clock signal ($f_2$) appears. When the signal $S_v$ having logic "1" is applied to the flip flop 72, the Q-output is held to be logic "0". Thereafter, the NOR gate 73 is held to be open, and the following equation (4) is obtained.

$$f_3=f_1 \tag{4}$$

Figure 8:
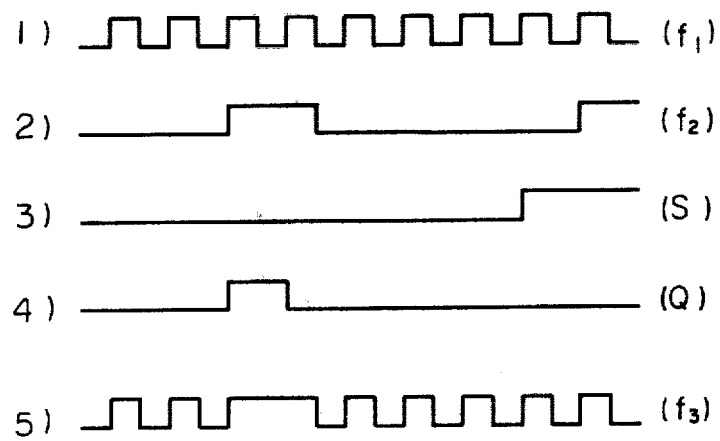
FIG. 8 is a chart of times used for explaining the operation of the pulse control circuit 53 of FIG. 7.

A feedback line 75 is effective from removing only one pulse for the clock signal ($f_1$) every time the rising edge of the clock signal ($f_2$) is applied to the AND gate 71. The operation of the circuit 53 shown in FIG. 7 will be more apparent by referring to the time charts shown in FIG. 8. In FIG. 8, the waveforms shown in items (1) through (5), respectively correspond to the signal ($f_1$), the signal ($f_2$), the signal ($S_v$), the signal from the Q-output of the circuit 53 and the signal ($f_3$).

Figure 9:
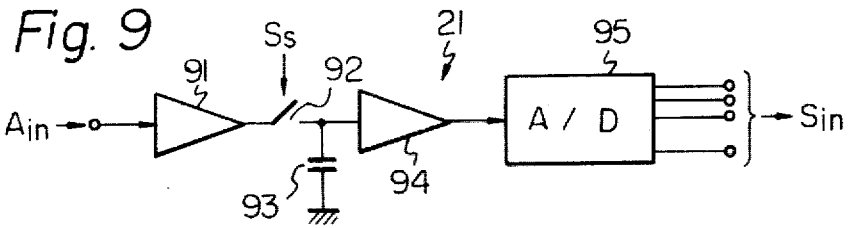
FIG. 9 is a circuit diagram illustrating the details of the sampling circuit 21 shown in FIGS. 2 and 5.

In FIG. 9, which is a circuit diagram illustrating details of the sampling circuit 21 shown in FIGS. 2 and 5, the circuit 21 comprises a pre-amplifier 91 which receives the analogue input signal $A_{in}$, a sampling switch 92 for sampling the signal $A_{in}$ in synchronism with the frequency of the sampling signal $S_s$, a capacitor 93 which holds the sampled signal $A_{in}$ and a post-amplifier 94. The amplifier 94 produces the sampled and amplified analogue input signal $A_{in}$. An Analogue/Digital converter (A/D) 95 converts the signal $A_{in}$ to the corresponding digital signal $S_{in}$.

Figure 10:
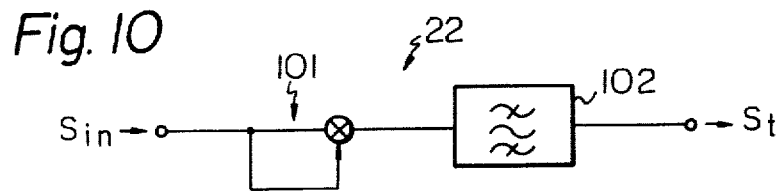
FIG. 10 is a circuit diagram illustrating the details of the timing signal extracting circuit 22 shown in FIGS. 2 and 5.

In FIG. 10, which is a circuit diagram illustrating details of the timing signal extracting circuit 22 shown in FIGS. 2 and 5, the circuit 22 comprises a squarer 101 and a band pass filter (BPF) 102. The symbol       denotes the product of the sampled digital input signal $S_{in}$ itself from the sampling circuit 21. The squarer 101 is constructed as an arithmetic logic circuit. The filter 102 is constructed as a narrow band digital filter. The filter 102 produces the timing signal $S_t$ which has been included in the analogue input signal $A_{in}$. The combination of the digital squarer 101 and the digital filter 102 has equivalent functions (sampled version) of analog squarer and analog filter as can be seen from the publication, for example "Theory and Application of Digital Signal Processing" Prentice-Hall, 1975, by Rabiner Gold.

Returning to FIG. 4, as previously explained, the timing signal $S_t$ is quickly shifted rightward until, for example the signal $S_t$ (44) is located just at or close to the nearest virtual zero crossing $Z_{35}$. However, the timing signal $S_t$ may also be quickly shifted leftward. If the signal $S_t$ (45) is located closer to the nearest virtual zero crossing $Z_{35}$ than the signal $S_t$ (44) is located, it will be more preferable to shift the signal $S_t$ (45) leftward than to shift the signal $S_t$ (44) rightward, in order to complete the tuning operation in a very short time. The above mentioned leftward shift of the signal $S_t$ (45) cannot be achieved by removing the clock pulses from the output of the divider 51 (see FIG. 5), but it can be achieved by inserting a further clock pulse thereto. In this case, the above recited equation (2), that is $f_3=f_1-f_2$ is not satisfied, but the following equation (5) is satisfied.

$$f_3=f_1+f_2 \tag{5}$$

Therefore, each period between each two adjacent timing signals $S_t$ (41, 42, 43, 44, 45, 46, 47 and so on) is caused to be short. In other words, all the timing signals $S_t$ are shifted leftward on the drawing of FIG. 4 very quickly.

The pulse control circuit 53 shown in FIG. 7 is available only for achieving the aforesaid rightward shift of the timing signal $S_t$. Accordingly, if the aforesaid leftward shift of the timing signal $S_t$ is also required in the pulse control circuit 53 of FIG. 5, this circuit 53 should also contain a circuit 53' shown in FIG. 11, in addition to the circuit 53 shown in FIG. 7. In this case, the circuit 55 of FIG. 5 should further include a selection circuit 130, shown in FIG. 13, for producing a selection signal $S_l$ (see FIG. 5) and applying it to the pulse control circuit 53 (see FIG. 5). The signal $S_l$ indicates whether the aforesaid rightward shift or leftward shift must be achieved in the timing-phase recovery circuit 50 (see FIG. 5). If, for example the absolute peak value of the signal $S_t$ (44) is larger than that of the signal $S_t$ (45), the selection signal $S_l$ activates the circuit 53' (see FIG. 11). While, if the absolute peak value of the signal $S_t$ (44) is smaller than that of the signal $S_t$ (45), the selection signal $S_l$ activates the previously explained circuit 53 of FIG. 7.

Figure 11:
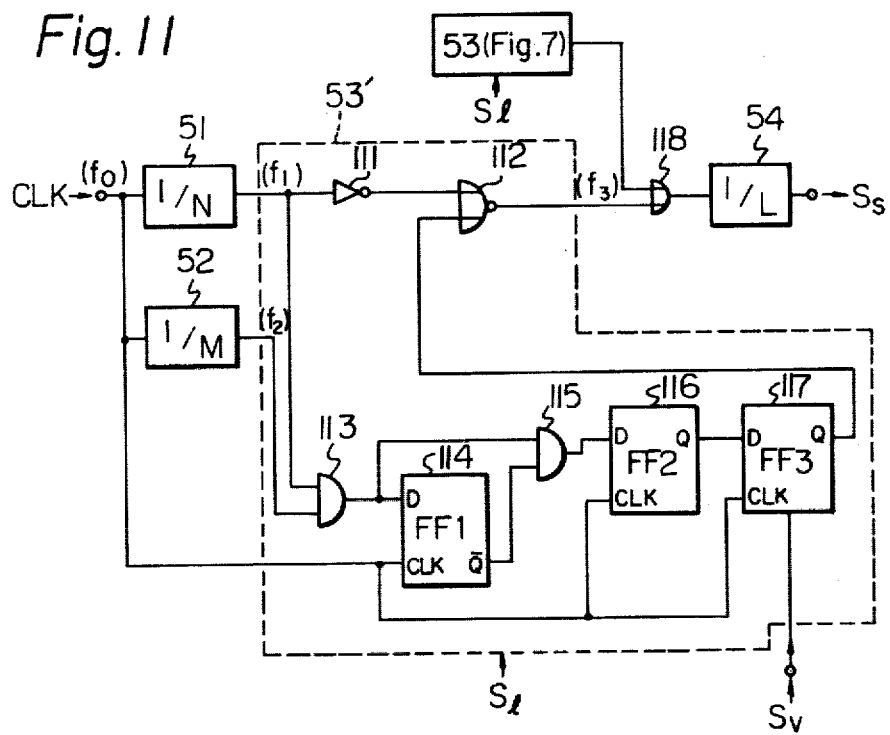
FIG. 11 is a circuit diagram illustrating the details of an alternative embodiment of the pulse control circuit 53 shown in FIG. 5, according to the present invention.
Figure 12:
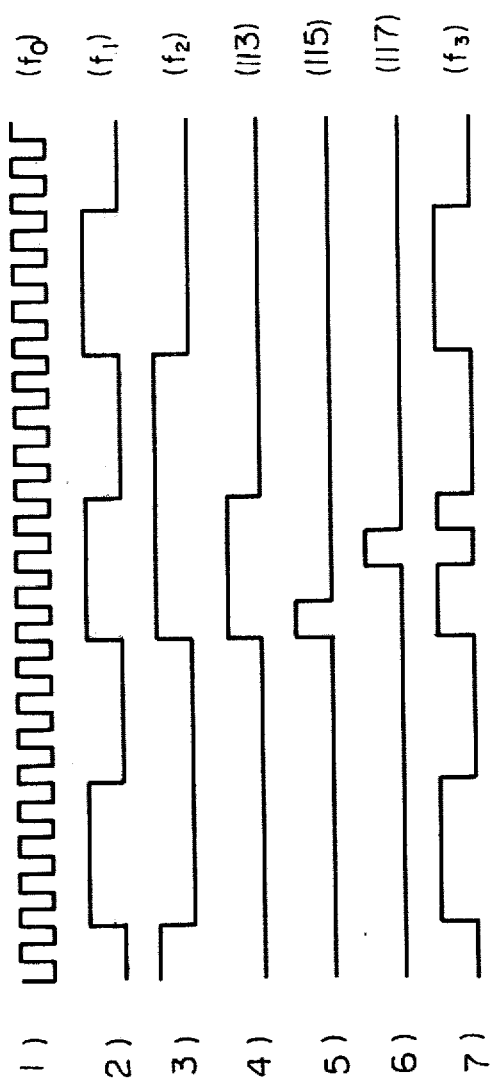
FIG. 12 is a timing chart for explaining the operation of the circuit 53' shown in FIG. 11.

In FIG. 11, which is a circuit diagram illustrating details of another type of the circuit 53 shown in FIG. 5, the members 51, 52, 54, the signals CLK, $S_s$, $S_v$, $S_l$ and symbols $F_0$, $f_1$, $f_2$ and $f_3$ have already been explained hereinbefore. The pulse control circuit 53' comprises an inverter 111, a NOR gate 112, AND gates 113 and 115, delay flip flops 114, 116 and 117 and an OR gate 118. The block 53 (FIG. 7) represents the pulse control circuit 53 shown in FIG. 7. The operation will be apparent by referring to the timing charts shown in FIG. 12. The columns 1) through 7) show, respectively the waveform of the signal ($f_0$), the signal ($f_1$), the signal ($f_2$), the signal of the output from the AND gate 113, the signal of the Q-output from the flip flop 115, the signal of the Q-output from the flip flop 117 and the signal ($f_3$). During the application of the signal $S_v$ having logic "0" to the flip flop 117, the above recited equation (5), that is $f_3=f_1+f_2$, is satisfied every time the rising edge of the signal ($f_2$) (see FIG. 12, line 3) is applied to the AND gate 113. The signals ($f_1$) and ($f_2$) are applied to the AND gate 113. The output from the gate 113 is differentiated by means of both the flip flop 114 and the AND gate 115. Thus, the output from the gate 115 has a frequency of $f_2$ and a pulse width equal to the period of the signals ($f_0$) (see FIG. 12, lines 1 and 5). The output from the gate 115 is delayed by the flip flops 116 and 117.

Then both the Q-output of the flip flop 116 and the inverted signal (f₁) are applied to the NOR gate 112. The output from this gate 112 is represented by the waveform shown in FIG. 12, line 7. Thus, the clock signal having the frequency $f_3$ ($=f_1+f_2$) is produced from the circuit 53'. When the signal $S_v$ having logic "1" is applied to the flip flop 117, the Q-output of the flip flop 117 becomes logic "0", and accordingly the pulse insertion is stopped. Thereafter, the frequency $f_3$ is held being the frequency which is equal to $f_1$.

Figure 13:
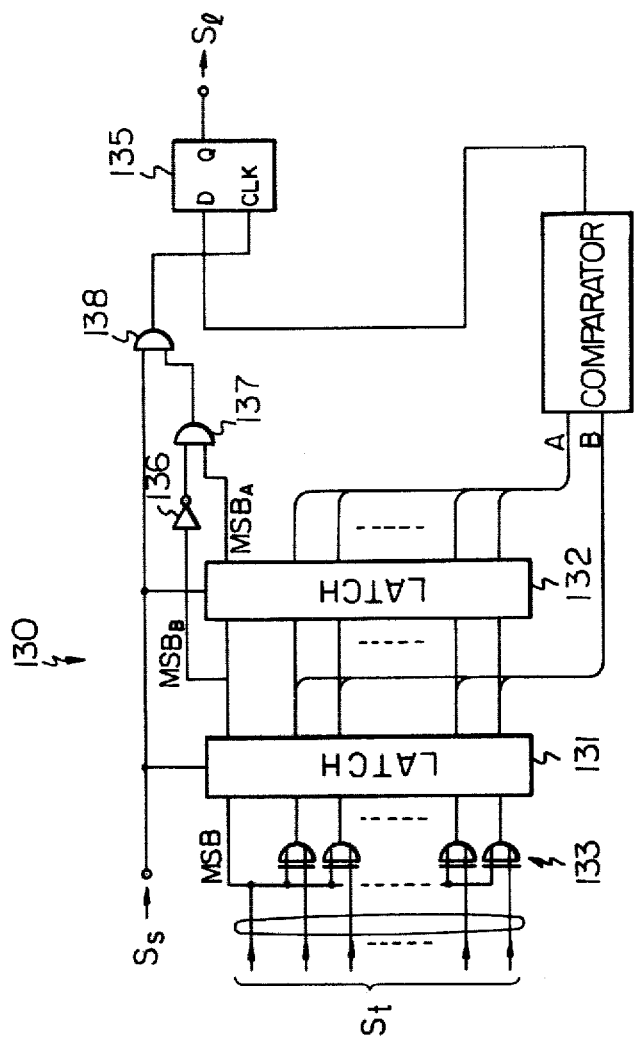
FIG. 13 is a circuit diagram illustrating a selection circuit for generating the selection signal S1 shown in FIG. 5, according to the present invention.

FIG. 13 is a circuit diagram illustrating details of the aforesaid selection circuit 130. The selection circuit 130 discriminates between the large and small absolute peak levels of the positive signal $S_t$ (45) and the negative signal $S_t$ (44) both being located close to their nearest virtual zero crossing $Z_{35}$ (see FIG. 4), and the circuit 130 produces the selection signal $S_l$. The signal $S_l$ having logic "1" indicates that the pulse insertion should be performed (corresponding to $f_3=f_1+f_2$) and the circuit 53' of FIG. 11 should be actuated. The signal $S_l$ having logic "0" indicates that the pulse removal should be performed (corresponding to $f_3=f_1-f_2$), and accordingly the circuit 53 of FIG. 7 should be actuated. The circuit 130 receives the timing signal $S_t$ (see FIG. 5). The signal $S_t$ is applied to a first latch circuit 131 and stored momentarily therein in synchronism with the frequency of the sampling signal $S_s$. The most significant bit (MSB) of the signal $S_t$ is directly applied to the circuit 131, while the other bits of the signal are applied thereto by way of EOR (Exclusive OR) gates 133. Since the MSB, which indicates the polarity of the signal $S_t$, is commonly applied to the EOR gates 133, the outputs from the EOR gates represent the absolute peak value of each signal $S_t$. The output from the circuit 131 is transferred to a second latch circuit 132 and stored therein in synchronism with the frequency of the sampling signal $S_s$. Accordingly, the circit 131 stores the absolute peak value of the present signal $S_t$, while the circuit 132 stores the absolute peak value of one preceding signal $S_t$. The absolute peak value A from the circuit 132 is compared with the absolute value B from the circuit 131 by means of a comparator 134. The result from the comparator 134 is applied to a delay flip flop 135, at its D-input. The flip flop 135 produces the signal $S_l$, at its Q-output. However, the signal $S_l$ is available only when a clock signal, which is identical with the sampling signal $S_s$, is applied to a CLK-input of the flip flop 135. This clock signal is produced from an AND gate 138 only when an AND gate 137 produces an output having logic "1". The gate 137 receives both the $MSB_B$ stored in the circuit 131 via an inverter 136 and the $MSB_A$ stored in the circuit 132. Accordingly, the AND gate 137 produces logic "1" only when the $MSB_A$ is logic "1" and, at the same time, the $MSB_B$ is logic "0". When the signals $S_t$ (44) and $S_t$ (45) (see FIG. 4) are stored, respectively in the circuits 132 and 131, the $MSB_B$ is logic "1" and the $MSB_A$ is logic "0". Therefore, the AND gate 137 and also the AND gate 138 become open, and then the result of the comparison, in the comparator 134, between the outputs A and B is available. If the output A (corresponding to the signal $S_t$ (44)) is larger than the output B (corresponding to the signal $S_t$ (45)), the signal $S_l$ becomes logic "1". If the output A is smaller than the output B, the signal $S_l$ becomes logic "0", wherein these logics "1" and "0", respectively indicate the aforesaid pulse insertion (corresponding to the equation $f_3=f_1+f_2$) and the pulse removal (corresponding to the equation $f_3=f_1-f_2$).

Next, a second embodiment of the timing-phase recovery circuit according to the present invention will be described. In FIG. 14, which is a block diagram illustrating the second embodiment of the timing-phase recovery circuit of the present invention, a timing-phase recovery circuit 140 comprises a pulse control circuit 141, a pseudo sampling pulse insertion circuit 142, a pulse number setting circuit 143 and also the aforementioned circuits 21, 22, 51, 54 and 55. The symbols CLK, $f_1$, $f_3$, $S_s$, $A_{in}$ and $S_v$ have already been explained. The operation of this circuit 140 will be clarified by referring to FIG. 15. The imaginary pulse train of the digital output from the circuit 142 is depicted in line (1) of FIG. 15, and the imaginary pulse train of the timing signal from the timing signal extracting circuit 22 is depicted in line (2) of the FIG. 15. Referring to both FIGS. 14 and 15, the pulses 151 and 152 represent the actual sampled signal. Accordingly, the period T between the pulses 151 and 152 equals $1/f_s$, that is $T=1/f_s$, where $f_s$ is the frequency of the sampling $S_s$. Pulses 153-1, 153-2, 153-3 are pseudo sampling pulses generated by the pseudo sampling pulse insertion circuit 142. Accordingly, each period t between each two adjacent pulses equals $$\frac{1}{(k+1)f_s},$$

where k is the number of pseudo sampling pulses 153-1, 153-2, 153-3. In this case, k is equal to 3. Each pseudo sampling pulse has a zero value. Therefore, these pseudo sampling pulses do not have any bad effects on the tuning operation. Since the sampling signal having a high frequency of $(k+1)f_s$ is applied to the timing signal extracting circuit 22, a timing signal $S_t'$ having the frequency of $(k+1)f_s$ is produced from the circuit 22. The timing signal $S_t'$ from the circuit 22 is depicted in line (2) in FIG. 15. It should be noted, in line (2), that the hatched timing signal 154 is in-phase with the sampling pulses 151, 152 and so on (see line (1)), while the non-hatched pulses 155 are in-phase with the pseudo sampling pulse 153-1, 153-2 and so on (see line (1)). Each period between each two adjacent timing signals (154, 155) is τ. In line (2) the virtual zero crossings are indicated by reference symbols $Z_0$, $Z_1$ and so on. However, only the zero crossing $Z_1$ is available, as has already been explained with reference to FIG. 4 in regard to the virtual zero crossings $Z_{33}$, $Z_{35}$ and so on. The advantage of the second embodiment shown in FIG. 14 resides in that the virtual zero crossing can be detected instantaneously. This is because, for example, the location of the virtual zero cross $Z_1$ (see line (2) in FIG. 15) can be detected by the nearest timing signal 156 or 157. The detection of the zero crossing $Z_1$ can be achieved by means of the virtual zero crossing detector 55, which has already been explained hereinbefore. If the zero crossing $Z_1$ is detected by the real timing signal $S_t'$ such as the signal 157, the tuning operation is completed instantaneously. This is because the real timing signal is in-phase with the sampling signal $S_s$ of the timing-phase recovery circuit. In contrast, if the zero crossing $Z_1$ is detected by the pseudo timing signal (or interpolated timing signal) $S_t'$ such as the signal 156, it is necessary to substituted the signal 156 for the real timing (non-interpolated) signal. This is because the non-hatched timing signal is not in-phase with the sampling signal $S_s$. Therefore, the pulse number setting circuit 143 and also the pulse control circuit 141 (see FIG. 14) are introduced into the timing-phase recovery circuit. The circuit 143 counts a different number of timing signals between the pseudo timing signal, which has detected the virtual zero crossing, and the nearest real timing signal. Then the different numbers counted from the circuit 143 are supplied to the circuit 141. If the different number counted is zero, the cock signal ($f_1$) from the divider 51 is not processed. If the counted number is not zero, the clock signal ($f_1$) is transformed to the clock signal ($f_3$) by means of the circuit 141, in order to cause the sampling signal $S_s$ to be in-phase with the frequency of the virtual zero crossings. Specifically, the circuit 141 removes the same number of clock pulses as said different numbers counted from the clock signal ($f_1$).

Figure 16:
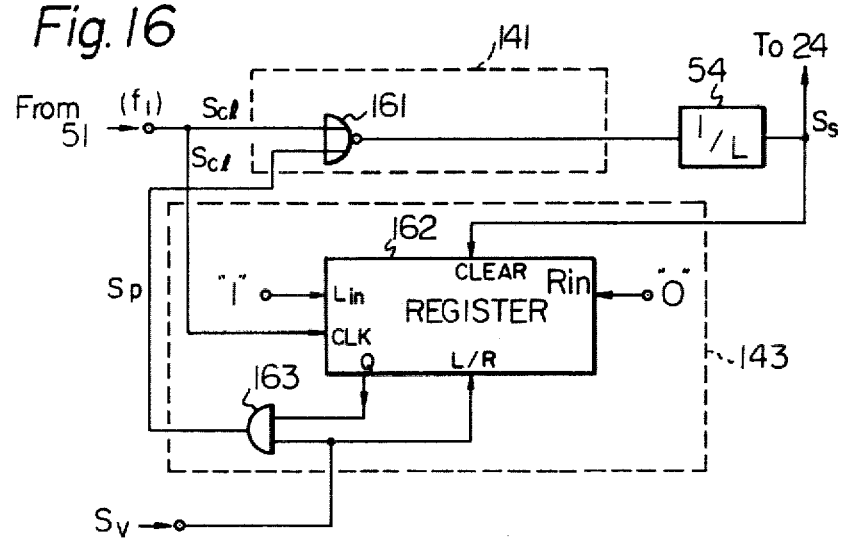
FIG. 16 is a circuit diagram illustrating the details of circuits 141 and 143 shown in FIG. 14, according to the present invention.

In FIG. 16, which is a circuit diagram illustrating details of the circuits 141 and 143 shown in FIG. 14, a block 141 is identical with the circuit 141 of FIG. 14 and a block 143 is identical with the circuit 143 of FIG. 14. Signals $S_p$, $S_{cl}$, $S_s$ and $S_v$ are also shown in FIG. 14. The circuit 141 is comprised merely of a NOR gate 161 which receives both the clock signal $S_{cl}$ having the frequency of $f_1$ ($f_1 = f_0/N$) and the signal $S_p$. The circuit 143 is comprised of the so-called bidirectional shift register 162, for example the SN74198 manufactured by Texas Instruments Co., Ltd., and an AND gate 163. The register 162 is cleared to its initial state by the sampling signal $S_s$, whereby the logic all "0" is stored therein. Then the logic "1" is supplied thereto from an $L_{in}$-input one-by-one in a rightward direction during which the signal $S_v$ is logic "0" which indicates the virtual zero crossing is not yet detected. During this time, the AND gate 163 is not open. When the signal $S_v$ changes from logic "0" to logic "1", the AND gate 163 is opened. At the same time, a shift in direction of the logic stored in the register 162 is inverted, because "1" is applied to the register 162, at its L/R-input. Thereafter, logic "0" is supplied thereto from an $R_{in}$-input. Accordingly, each logic "1" which has already been stored in the register 162 is poured one-by-one from a Q-output thereof, and then applied to the NOR gate 161 by way of the AND gate 163, in synchronism with the clock signal ($f_1$) which is applied to a CLK-input thereof. It should be noted that the number of logic "1" which has been stored in the register 162 is the same as the aforesaid different number of timing signals the pseudo timing signal has detected between the virtual zero crossing and the nearest real timing signal. Consequently, the NOR gate 161 is closed while a signal $S_p$ having logic "1" is supplied one-by-one from the AND gate 163 to the NOR gate 161, and the clock signal ($f_1$) is not provided from the NOR gate 161. As a result, the sampling signal $S_s$ from the divider 54 becomes in-phase with the frequency of the virtual zero crossings.

Figure 17:
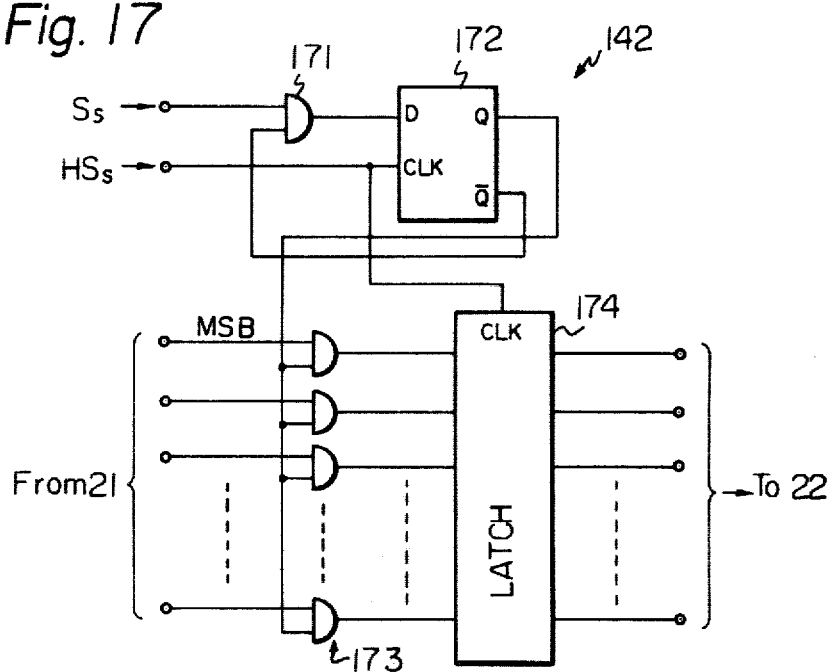
FIG. 17 is a circuit diagram illustrating the details of a circuit 142 shown in FIG. 14, according to the present invention.

FIG. 17 illustrates the details of the pseudo sampling pulse insertion circuit 142 of FIG. 14, which comprises an AND gate 171, a delay flip flop 172, AND gates 173 and a latch circuit 174. The flip flop 172 is driven by a clock signal $HS_s$ having a frequency of $(k+1)f_s$, where $f_s$ is the sampling frequency. The signal $HS_s$ may be produced by a suitable frequency divider (not shown) which receives the reference clock signal CLK (see FIG. 14). When the sampling signal $S_s$ is applied, via the AND gate 171, to the flip flip 172, the Q-output thereof changes logic "0" to "1". Then the AND gates 173 open, and the asmpled signal from the sampling circuit 21 (see FIG. 14) is stored momentarily in the circuit 174. The stored sampling signal is then applied to the timing signal extracting circuit 22 (see FIG. 14), and the circuit 22 produces the aforesaid real timing signal $S_t'$. When the Q-output changes logic "0" to "1", the $\overline{Q}$-output changes logic "1" to "0" and this causes the AND gate 171 to close. At the same time, the AND gates 173 are closed and the circuit 174 sequentially stores logic "0" in synchronism with the application of the $HS_s$. The sequentially stored "0"S are then applied to the circuit 22 as the aforesaid pseudo timing signal $S_t'$.

FIG. 18 is a block diagram showing a modified arrangement of the blocks 21, 142 and 22 of FIG. 14. In FIG. 18, a pre-filter 181 is newly introduced, and the circuit 142 is located between the squarer 101 and the narrow band pass filter 102 (see FIG. 10). The advantages of the arrangement are as follows. First, a noise contained in the analogue input signal $A_{in}$ is extracted in advance from the filter 181 which has a very narrow band pass frequency range, for example, one half of the frequency of the timing signal. Second, the pre-filter 181 and the squarer 101 can operate with relatively low operational speed, because the pseudo sampling pulse insertion circuit 142 follows the circuits 181 and 101.

Figure 20:
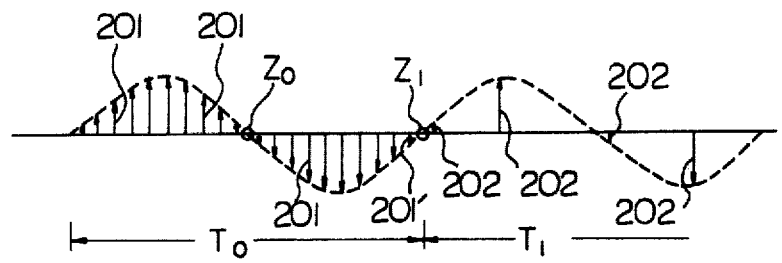
FIG. 20 depicts an imaginary analogue waveform of a timing signal $S_t$ generated by a circuit 22 shown in FIG. 19.

Now, a third embodiment of the timing-phase recovery circuit according to the present invention will be described by referring to FIG. 19. In FIG. 19, there is a frequency switching circuit 191 and a switch control circuit 192. The operation of the circuit 190 will be explained with reference to the imaginary analogue timing signal waveform shown in FIG. 20. Referring to FIG. 20, in an initial interval $T_o$, a fine timing signal 201 having a high frequency is produced. Accordingly, the virtual zero crossing $Z_1$ is detected instantaneously by the corresponding fine timing signal 201'. Then a next interval $T_1$ starts. In the interval $T_1$, a coarse timing signal 202 is produced, each signal 202 corresponding to the aforesaid usual timing signal $S_t$. Thus, the tuning operation is completed in a very short time. Further, the frequency divider 54 is reset to its initial state by a reset signal Y (see FIG. 19) from the circuit 192, which is produced when the zero crossing $Z_1$ is detected by the signal 201'. Therefore, the sampling signal $S_s$ is, instantaneously, caused to be in-phase with the frequency of the zero crossings. Referring to both FIGS. 19 and 20, the fine timing signal 201 is obtained by sampling the signal Ain in synchronism with a clock signal $S_s'$ having a high frequency. The signal $S_s'$ is produced from the divider 51. When the virtual zero crossing $Z_1$ is detected by the circuit 55, the switch control circuit 192 produces a switching signal X and applies this to the circuit 191. Then the circuit 191 produces not the clock signal $S_s'$ but rather the sampling signal $S_s$, and the interval $T_1$ starts.

Figure 21:
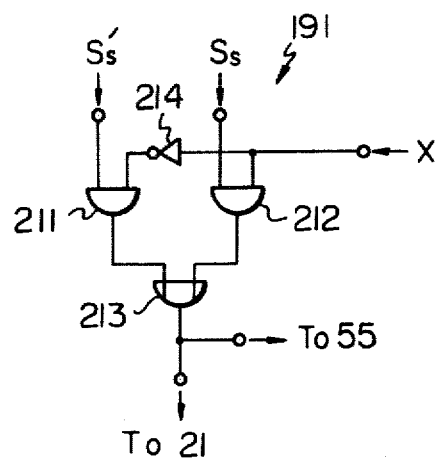
FIG. 21 is a circuit diagram illustrating the details of a circuit 191 shown in FIG. 19, according to present invention.

FIG. 21 is a circuit diagram illustrating details of the frequency switching circuit 191 of FIG. 20, which comprises an AND gate 211 which receives the signal $S_s'$, an AND gate 212 which receives the signal $S_s$ and an OR gate 213. When the signal X having logic "0" is supplied from the circuit 192, only the AND gate 211 opens due to the presence of an inverter 214. The signal X having logic "0" indicates that the virtual zero crossing is not yet detected. Accordingly, the signal $S_s'$ having a high frequency is produced from the OR gate 213. When the virtual zero crossing is detected, the logic of the signal X changes from "0" to "1". Accordingly, the usual sampling signal $S_s$ is produced from the OR gate 213.

Figure 22:
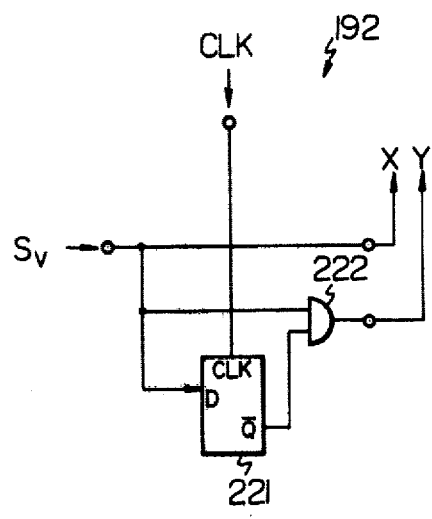
FIG. 22 is a circuit diagram illustrating the details of a circuit 192 shown in FIG. 19, according to the present invention.

In FIG. 22, which is a circuit diagram illustrating details of the switch control circuit 192 shown in FIG. 19, the circuit 192 comprises a delay flip flop 221 and an AND gate 222. As seen in FIG. 22, the switching signal X is the same as the virtual zero crossing signal $S_v$ from the circuit 55 (see FIG. 19 and refer to FIG. 6). Since both the flip flop 221 and the AND gate 222 operate as a differentiating circuit, the reset signal Y is substantially the same as the rising edge of the signal X. Therefore, the pulse width of the signal Y is very narrow, and the divider 54 (see FIG. 19) is reset to its initial state with a capability of a very fine timing resolution which is comparable with the narrow pulse width of the reference clock signal CLK.

Figure 23:
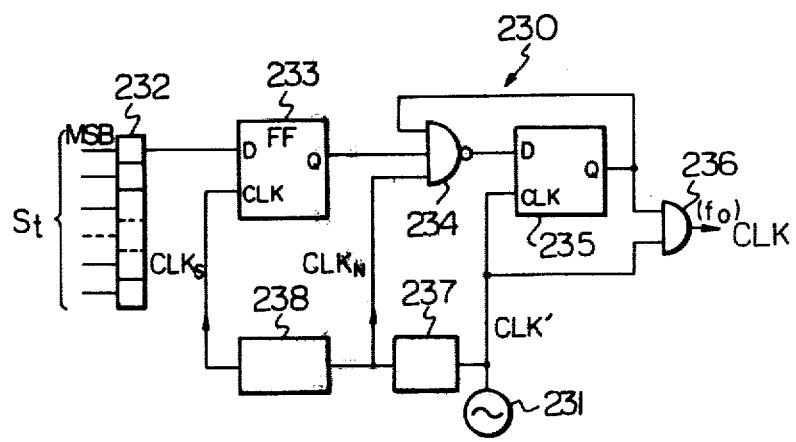
FIG. 23 is a circuit diagram illustrating a circuit for suppressing a timing jitter included in the timing signal.

As mentioned above, the tuning operation of the timing-pulse can be completed in a very short time by utilizing any one of the timing-phase recovery circuits shown in FIGS. 5, 14 and 19. However, since the timing signal $S_t$ always includes the so-called timing jitter and small frequency offset, a steady state-tuning operation should be followed after the aforesaid tuning operation, in order to cancel the timing jitter and timing frequency offset. Once the tuning operation is completed, the sampling signal $S_s$ is maintained to be in-phase with the frequency of the virtual zero crossings, however, the actual sampling signal $S_s$ is not correctly in-phase therewith due to the presence of the timing jitter. Therefore, it is further required to incorporate into each of the above mentioned timing-phase recovery circuits 50, 140 and 190, a circuit for suppressing the timing jitter. FIG. 23 is a circuit diagram illustrating a preferred embodiment of the circuit for suppressing the timing jitter 230 which is constructed as a part of a reference clock generator which produces the aforesaid reference clock signal CLK (refer to FIG. 2, 5, 14, 19 or 22). The circuit 230 includes a reference oscillator 231 which produces a clock signal CLK' having a frequency slightly higher than the nominal frequency $f_0$ by $\Delta f$, where $\Delta f$ is, for example about 100 Hz. The clock signal CLK' is applied to an AND gate 236 which produces the reference clock signal CLK. The AND gate 236 is caused to be closed when the phase of the sampling signal leads with respect to the phase of the frequency of the virtual zero crossings. In this case, the timing signal $S_t$ appears slightly before the appearance of the virtual zero crossing (refer to the timing signal, for example the signal 44-shown in FIG. 4). In such a case, the MSB of the timing signal $S_t$ is logic "1", because the polarity of this signal is negative. The MSB having a logic "1" is momentarily stored in a register 232, and then applied to a delay flip flop 233. Accordingly, a Q-output having a logic "1" of the flip flop 233 is applied to a NAND gate 234. At this time, a delay flip flop 235 produces a logic "1" at its Q-output, which logic "1" is also applied to the NAND gate 234. Therefore, the NAND gate 234 produces logic "0" when the logic "1" of a clock signal $CLK_N$ is applied thereto. The logic "0" from the Q-output of the flip-flop 235 closes the AND gate 236. Since the AND gate 236 is closed, the frequency of the reference clock signal CLK is reduced to $(f_0-\Delta f)$. Once the Q-output of the flip flop 235 becomes logic "0", the NAND gate 234 is closed again. A clock signal $CLK_S$ is applied to the flip flop 233 at its CLK-input. The signal $CLK_S$ has a frequency which is one fourth the sampling frequency $f_s$. That is, the signal $CLK_S$ is produced nearly in-phase with the virtual zero crossings, for example $Z_{33}$, $Z_{35}$ and so on as shown in FIG. 4. The clock signal $CLK_N$ has a frequency of $2\Delta f$, for example about 200 Hz. The signal $CLK_N$ is derived from the clock signal CLK' $(f_0+\Delta f)$ via a frequency divider 237. The signal $CLK_S$ is derived from the clock signal CLK' via the divider 237 and a frequency divider 238.

In contrast, if the phase of the sampling signal lags with respect to the phase of the timing signal, the Q-output of the flip flop 233 produces logic "0", and accordingly the AND gate 236 opens. Therefore, the clock signal CLK having the frequency of $(f_0+\Delta f)$ is provided. Thus, the timing jitter included in the timing signal $S_t$, can be suppressed.

As explained above, the present invention is very useful for achieving a very quick tuning operation of the timing-phase recovery circuit.

While there has been described what is considered to be a preferred embodiment of the invention, variations and modifications in the invention may occur to those skilled in the art once they become acquainted with the invention. Therefore, it is intended that the appended claims shall be construed as including all such variations and modifications as would occur to one of ordinary skill in the art.

What is claimed is:

1. A timing-phase recovery circuit used for achieving a tuning operation between a phase of a sampling signal generated in a receiver and a phase of a timing signal included in a received input analogue signal, comprising:
   (a) a reference clock generating means for generating a reference clock signal;
   (b) a sampling signal generating means for generating the sampling signal which is derived from the reference clock signal;
   (c) a sampling means for producing a sampled input analogue signal by using the sampling signal;
   (d) a timing signal extracting means for producing the timing signal from the sampled input analogue signal; and
   (e) a virtual zero crossing detecting means for comparing the value of the timing signal with a zero value and for generating a virtual zero crossing detecting signal by using the sampling signal, said sampling signal generating means conducting a phase shift of the sampling signal in accordance with the existence or non-existence of the virtual zero crossing detecting signal.

2. A circuit as set forth in claim 1, wherein the virtual zero crossing detecting means comprises:
   a latch circuit for receiving and storing the timing signal in synchronism with the sampling signal, wherein the timing signal is expressed by a two's-complement indication;
   a first NAND gate and a first NOR gate, each of which gates is connected to the latch circuit to receive the upper few bits, other than a most significant bit, of the timing signal supplied from the latch circuit;
   a second NAND gate and a second NOR gate, each having first inputs connected to the outputs from the first NAND gate and the first NOR gate, respectively, and each having second inputs connected to receive said most significant bit;
   an inverter connected to the output of said second NOR gate;
   a first AND gate having a first input connected to the output of the inverter and having a second input connected to the output of the second AND gate;
   a delay flip flop, having a CLOCK-input, a D-input, and a Q-output, connected to said latch circuit, for receiving said most significant bit and the sampling signal, at its CLOCK-input and D-input, respectively; and a second AND gate having a first input connected to the output of the first AND gate, having a second input connected to the Q-output of the delay flip flop, and having an output for providing the virtual zero crossing detecting signal.

3. A circuit as set forth in claim 1, wherein the sampling signal generating means comprises:

a frequency dividing means for dividing the frequency of the reference clock signal; and a pulse control means for cooperating with the frequency dividing means to carry out the phase shift of the sampling signal by removing selected pulses from the pulse train of the divided reference clock signal when the virtual zero crossing detecting signal exists.

4. A circuit as set forth in claim 1, wherein the sampling signal generating means comprises:

a frequency dividing means for dividing the frequency of the reference clock signal; and a pulse control means for cooperating with the frequency dividing means to carry out the phase shift of the sampling signal by inserting selected pulses into the pulse train of the divided reference clock signal when the virtual zero crossing detecting signal exists.

5. A circuit as set forth in claim 1, wherein the sampling signal generating means comprises:

a frequency dividing means for dividing the frequency of the reference clock signal; and a pulse control means for cooperating with the frequency dividing means to carry out the phase shift of the sampling signal by selectively removing pulses from the pulse train of the divided reference clock signal or inserting pulses into the pulse train of the divided reference clock signal when the virtual zero crossing detecting signal exists.

6. A circuit as set forth in claim 1, wherein the sampling signal generating means comprises:

a sampling signal insertion means for inserting a pseudo sampling signal having a zero value into a real sampling signal;

a frequency dividing means for dividing the reference clock signal; and a pulse control means for cooperating with the frequency dividing means, wherein said zero crossing detecting means receives the digital timing signals which have been sampled by both the real and the pseudo sampling signals, said pulse control means including means for carrying out the phase shift by removing selected pulses from the pulse train of the divided reference clock signal, and wherein the number of the selected pulses to be removed is determined by the number of the timing signals which exist between the pseudo sampling signal located at the virtual zero crossing and the nearest real sampling signal.

7. A circuit as set forth in claim 1, wherein the sampling signal generating means comprises:

a frequency dividing means for dividing the frequency of the reference clock signal into a first divided clock signal and a second divided clock signal; and a pulse control means for cooperating with the frequency dividing means, said pulse control means for providing the first divided clock signal, as a first sampling signal, to said sampling means; said pulse control means for providing the second divided clock signal, as a second sampling signal, to said sampling means when the timing signal sampled by the first sampling signal is located at the virtual zero crossing; said frequency dividing means including means for providing the second sampling signal as the usual sampling signal, wherein the frequency of the first sampling signal is higher than that of the second sampling signal.

8. A circuit as set forth in claim 3, 4 or 5, wherein the frequency dividing means comprises a 1/N frequency divider, where N is an integer, for dividing the frequency of the reference clock signal; and a 1/M (M=K·N, where K≧2) frequency divider for dividing the frequency of the reference clock signal, wherein said pulse control means comprises a pulse control circuit for receiving both divided clock signals from said 1/N and 1/M frequency dividers; and a 1/L frequency divider (where L is an integer), connected to said pulse control circuit, for generating the sampling signal, wherein the sampling means comprises a sampling circuit for receiving the input analogue signal and generating the sampled input analogue signal therefrom in synchronism with the sampling signal, wherein the timing signal extracting means comprises a timing signal extracting circuit for extracting the timing signal from the sampled input analogue signal, wherein the virtual zero crossing detecting means comprises a virtual zero crossing detecting circuit for receiving the timing signal from the timing signal extracting circuit, and wherein the pulse control circuit performs the phase shift with respect to the output from the 1/N frequency divider every time the output from the 1/M frequency divider is applied to the pulse control circuit during the time when the zero crossing detecting circuit provides no virtual zero crossing detecting signal thereto.

9. A circuit as set forth in claim 8, wherein the pulse control circuit comprises:

an AND gate having a first input connected to the output of the 1/M frequency divider, having a second input, and having an output;

a delay flip flop having a D-input connected to the output of the AND gate, having a CLOCK-input connected to the output of the 1/N frequency divider, having a Q-output, having a RESET-input, and having a Q-output connected to the second input of the AND gate;

a NOR gate having a first input connected to the Q-output of the delay flip flop, having a second input connected to the output of the 1/N frequency divider, and having an output, wherein the delay flip flop is cleared by the application of the virtual zero crossing detecting signal thereto at its RESET-input, the output from the NOR gate being applied to the 1/L frequency divider.

10. A circuit as set forth in claim 8, wherein the pulse control circuit comprises:

a first AND gate having a first input connected to the output of the 1/N frequency divider, having a second input connected to the output of the 1/M frequency divider, and having an output;

a first delay flip flop having a D-input connected to the output of the first AND gate, and having a CLOCK input connected to the reference clock and having a Q-output;

a second AND gate having a first input connected to the output of the first AND gate, having a second input connected to the Q-output of the first delay flip flop, and having an output;

a second delay flip flop having a D-input connected to the output of the second AND gate, having a CLOCK-input connected to the reference clock and having a Q-output;

a third delay flip flop having a D-input connected to the Q-output of the second delay flip flop, having a CLOCK-input connected to the reference clock and having a Q-output; and an OR gate having a first input connected to the output of the 1/N frequency divider, having a second input connected to the Q-output of the third delay flip flop, and having an output connected to the 1/L frequency divider, the third delay flip flop being cleared by the application of the virtual zero crossing detecting signal thereto.

11. A circuit as set forth in claim 5, wherein the virtual zero crossing detecting means comprises a selection circuit, connected to said pulse control means, for generating a selection signal indicating whether the phase shift should be conducted by removing or inserting the pulses by comparing the values of the succeeding first and second timing signals, which exist, respectively before and after the appearance of the virtual zero crossing.

12. A circuit as set forth in claim 11, wherein the selection circuit comprises:

EOR gates, each of which has first and second inputs and an output connected to the timing signal extracting means, for receiving, at the respective first inputs, corresponding bits of the timing signal other than a most significant bit indicating the polarity thereof, the timing signal being expressed by a two's-complement indication, and for receiving, at the second inputs, the most significant bit;

a first latch circuit, connected to the outputs of the EOR gates and connected to the timing signal extracting means, for receiving the most significant bit in synchronism with the sampling signal;

a second latch circuit connected to receive the output of the first latch circuit in synchronism with the sampling signal;

a comparator, connected to the first and second latch circuits, for comparing the output values of the first and second latch circuits;

a delay flip flop having a D-input connected to the output of the comparator, having a CLOCK-input and having a Q-output for providing the selection signal;

an inverter connected to the first latch circuit;

a first AND gate having a first input, connected to receive the most significant bit stored in the second latch and having a second input connected to receive the most significant bit stored in the first latch circuit by way of the inverter;

a second AND gate having a first input, connected to the pulse control means, for receiving the samping signal, having a second input connected to the output of the first AND gate, and having an output connected to the CLOCK-input of the delay flip flop.

13. A circuit as set forth in claim 6, wherein the frequency divider means comprises a 1/N frequency divider, where N is an integer, for dividing the frequency of the reference clock signal, wherein the pulse control means comprises a pulse control circuit connected to receive the output of the 1/N frequency divider; and a 1/L frequency divider (where L is an integer) connected to the pulse control circuit, for receiving the output of the pulse control circuit and for producing the sampling signal, wherein the sampling means comprises a sampling circuit, connected to the 1/L frequency divider, for receiving the input analogue signal and for producing the sampled input analogue signal in synchronism with the sampling signal; and a sampling signal insertion circuit, connected to the sampling circuit, for inserting a pseudo sampled signal which is sampled by a pseudo sampling signal having a zero value, into the real sampled signal, wherein the timing signal extracting means comprises a timing signal extracting circuit, connected to the sampling signal insertion circuit, for extracting the timing signal from the output signal supplied by the sampling signal insertion circuit, which timing signal is a signal sampled by both the real and the pseudo sampling signals, and wherein the virtual zero crossing detecting means comprises a virtual zero crossing detecting circuit, connected to the timing signal extracting circuit and the 1/L frequency divider, for receiving the timing signal from the timing signal extracting circuit in synchronism with the real sampling signal; and a pulse number setting circuit, connected to the virtual zero crossing detecting circuit and the pulse control circuit, for producing a pulse number setting signal representing the number of pulses between the pseudo timing signal located at the virtual zero crossing and the nearest real timing signal, and wherein the phase shift is carried out by the pulse control circuit in accordance with the pulse number setting signal.

14. A circuit as set forth in claim 13, wherein the pulse number setting circuit comprises a bidirectional shift register having a CLOCK-input connected to the output of the 1/N frequency divider having a CLEAR-input connected to the sampling circuit for receiving the sampling signal, having L-in, R-in and L/R inputs, and having a Q-output; and an AND gate having a first input connected to the Q-output of the bidirectional shift register and having a second input connected to the virtual zero crossing detecting signal, wherein said pulse control circuit comprises a NOR gate having first and second inputs connected to the output of the 1/N frequency divider and the output of the AND gate, respectively, and having an output connected to the 1/L frequency divider, and wherein the virtual zero crossing detecting signal is applied to the L/R-input of the bidirectional shift register, and the $L_{in}$-terminal and the $R_{in}$-terminal are respectively connected to receive an input having logic "1" and an input having logic "0".

15. A circuit as set forth in claim 13, wherein the sampling signal insertion circuit comprises:

first AND gates connected to receive, at their respective first inputs, corresponding bits of the timing signal which is expressed by a two's-complement indication;

a latch circuit, having a CLOCK input, connected to the outputs of the first AND gates for producing the output to be applied to the timing signal extracting circuit;

a delay flip flop, having a CLOCK input, having a Q-output, and having a Q-output commonly connected to the respective second inputs of the first AND gates;

a second AND gate having a first input, connected to the 1/L frequency divider, for receiving the sampling signal having a frequency $f_s$ and having a second input connected to the Q-output of the delay flip flop, wherein a sampling signal having a frequency $f_s'$ ($f_s' > f_s$) is applied to the CLOCK-inputs of the delay flip flop and the latch circuit.

16. A circuit as set forth in claim 13, wherein the timing signal extracting circuit comprises:

a digital squarer operatively connected to the sampling circuit; and a digital narrow band pass filter operatively connected to the digital squarer.

17. A circuit as set forth in claim 16, wherein the timing signal extracting circuit further comprises a prefilter connected in series between the sampling circuit and the digital squarer, wherein the digital squarer is connected between the sampling circuit and the sampling signal insertion circuit, and wherein the digital narrow band pass filter is connected to the sampling signal insertion circuit and the virtual zero crossing detecting circuit.

18. A timing-phase recovery circuit as set forth in claim 1, wherein the reference clock generating means comprises means for suppressing a timing jitter and frequency offset included in the timing signal.

19. A timing-phase recovery circuit as set forth in claim 18, wherein the means for suppressing the timing jitter includes an oscillator for producing an internal clock signal, the frequency of the internal clock signal being higher than a nominal frequency ($f_o$) of the clock signal by a frequency (f), the frequency of the clock signal being variable from ($f_o - \Delta f$) to ($f_o + \Delta f$) in dependence upon the difference between the phase of the sampling signal and the phase of the timing signal.

* * * * *